United States Patent [19]

Rabatin

[11] 4,007,394
[45] Feb. 8, 1977

[54] ALKALI METAL ALKALINE EARTH METAL SULFATE PHOSPHOR ACTIVATED WITH CERIUM AND TERBIUM AND LAMP CONTAINING SAME

[75] Inventor: Jacob G. Rabatin, Chardon, Ohio
[73] Assignee: General Electric Company, Schenectady, N.Y.
[22] Filed: Apr. 7, 1975
[21] Appl. No.: 565,643
[52] U.S. Cl. .................. 313/486; 252/301.4 S; 220/2.1 R
[51] Int. Cl.² ................ C09K 11/46; H01J 61/44
[58] Field of Search ............ 252/301.4 S, 301.4 R; 313/486

[56] References Cited

UNITED STATES PATENTS

| | | | |
|---|---|---|---|
| 3,650,976 | 3/1972 | Luckey | 252/301.4 S |
| 3,764,554 | 10/1973 | Schuil | 252/301.4 S |
| 3,778,615 | 12/1973 | Luckey | 252/301.4 S X |

FOREIGN PATENTS OR APPLICATIONS

| | | | |
|---|---|---|---|
| 42-13692 | 8/1967 | Japan | 252/301.4 S |
| 46-24884 | 7/1971 | Japan | 252/301.4 R |
| 650,491 | 2/1951 | United Kingdom | 252/301.4 S |

OTHER PUBLICATIONS

Blasse et al "J. Solid State Chem." 11, pp. 148–149, 1974.
Dixon et al "J. of Luminescence", 8, pp. 383–390, 1974.

*Primary Examiner*—Jack Cooper
*Attorney, Agent, or Firm*—John F. McDevitt; Lawrence R. Kempton; Frank L. Neuhauser

[57] ABSTRACT

Mixed rare earth alkali and alkaline earth sulfates activated with cerium and terbium are used as a phosphor coating system for fluorescent lamps. The phosphor efficiently emits light in the green region and the emission spectrum of the phosphor demonstrates a prominent peak in the 520–560 nm region with minor inflections at other visible wavelengths.

6 Claims, 2 Drawing Figures

U.S. Patent    Feb. 8, 1977    4,007,394
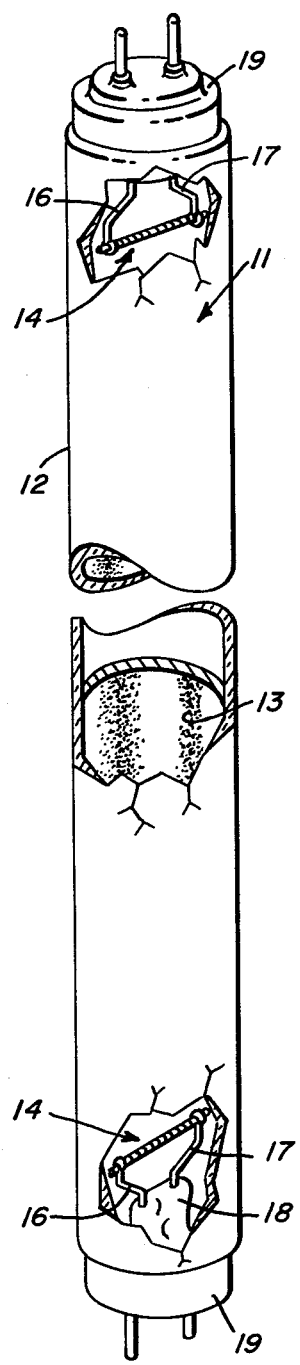
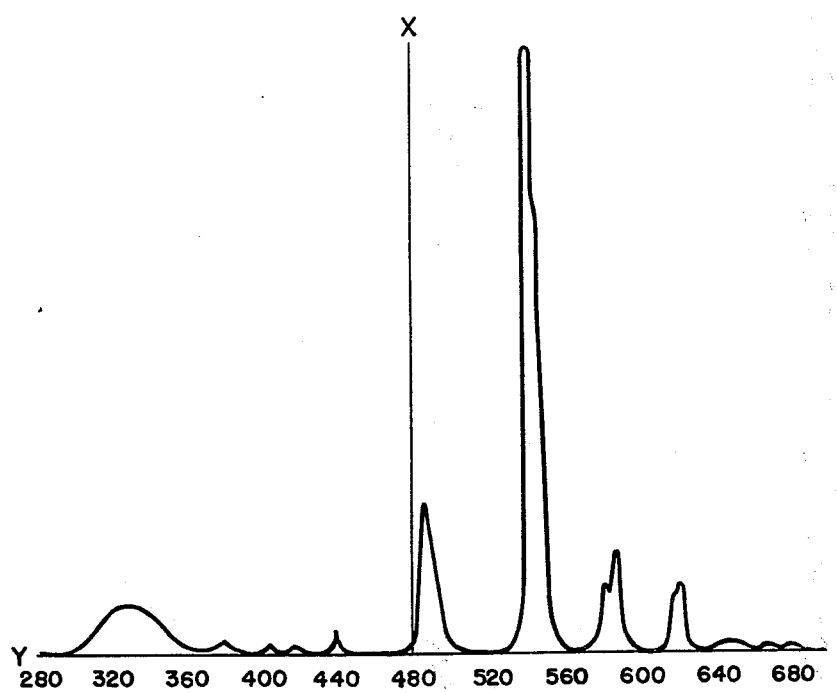

ALKALI METAL ALKALINE EARTH METAL SULFATE PHOSPHOR ACTIVATED WITH CERIUM AND TERBIUM AND LAMP CONTAINING SAME

BACKGROUND OF THE INVENTION

1. Field of the Invention

The present invention relates to phosphors for use in fluorescent lamps, and more particularly to an efficient phosphor emitting in the green region.

2. BRIEF DESCRIPTION OF THE PRIOR ART

Recently, a renewed interest has developed regarding the use of narrow band emitting phosphors for use in fluorescent lamps to achieve maximum color rendering properties at lumen levels comparable to standard CW and WW lamps. Members of the lamp industry have found that lamps comprising phosphors with narrow band emissions near 450, 540 and 610 lead to extraordinary improvements in color rendering index, luminance, in color discriminating capability, and in preferred rendering of object colors (brilliance). Commensurate with this interest, lamps are being made available on the market which utilize new narrow band green and blue emitting phosphors.

The luminescent material of the present invention is generally expressed by the formula:

$$M_xCa_{1-2x}(Ce, Tb)_xSO_4$$

where $M = Li$ or $Na$.

In an article by Dixon and Ekstrand, entitled "Thermoluminescence of Rare Earth Activated $CdSO_4$, $SrSO_4$ and $BaSO_4$", appearing in Journal of Luminescence 8 (1974) 383–390, North-Holland Publishing Company, a thermoluminescent material was disclosed, generally expressed by the formula $CaSO_4:Tb$. However, a thermoluminescent material exhibits an emission spectra or glow curve, only after the material is subjected to an external source of heat.

In an article by Blasse and Pietersen, entitled "Luminescence of Vanadium and Rare Earth Ions in Alkaline Earth Sulfates", appearing in Journal of Solid State Chemistry 11, 148–149 (1974), there is mention of a $CaSO_4$ phosphor co-activated with vanadium and various rare earth ions, including terbium. However, the emissions from such a phosphor exhibit only rare earth emission lines when excited with shortwave ultraviolet radiation.

U.S. Pat. Nos. 3,764,554 and 3,669,897 deal with various alkaline earth sulfate phosphors activated with divalent europium which emits longwave ultraviolet radiation when excited by a low pressure mercury arc discharge. U.S. Pat. No. 3,650,976 deals with mixed alkaline earth sulfate phosphors activated with various rare earth ions, including mention of cerium, but no mention of terbium, which also emit in the ultraviolet region with little emission above 425 nm wavelength, when excited by X-rays.

By reviewing the results of the prior art, there appears to be a lack of predictability for emission behavior of a particular phosphor host material under different activation and excitation, both as to the wavelength of emission and the emission intensity.

BRIEF DESCRIPTION OF THE PRESENT INVENTION

The present invention is directed to a phosphor that is generally characterized as an alkali metal, alkaline earth metal sulfate phosphor activated with cerium and terbium. The present phosphor has a high quantum efficiency when emitting visible light in the green region. Unlike prior art materials which show a number of emission lines in the transition between 530–560 nm, the present phosphor is characterized by a single peak in this region, with several inflections. The characteristics of the present phosphor system make it particularly useful as a coating in fluorescent lamps to achieve maximum color rendering properties at lumen levels comparable to standard CW and WW lamps. The present phosphor is generally expressed by the formula:

$$M_xCa_{1-2x}(Ce, Tb)_xSO_4$$

where $M = Li$ or $Na$.

This phosphor has the same distorted zircon-like tetragonal crystal structure as pure $CaSO_4$. However, the symmetry is more orthorhombic. Introduction of the relatively large amounts of M, Ce and Tb leads to shifts in 2 theta values and some line broadening which appears not to be due to particle size but to some randomization of unit cell dimensions. This appears to carry over to the emission spectra under 254 nm excitation. The Tb emissions would, in most hosts, show many lines. For example, the $5_D$ –$7_F$ transitions between 530–560 nm under the recording conditions usually show about 5–11 lines. On the other hand the present phosphor shows a single peak in this region with some inflections. The physical significance of this probably indicates that the distorted zircon-like structure has continuously varying crystal field effects leading to emission overlaps.

BRIEF DESCRIPTION OF THE FIGURES

FIG. 1 is a plot of light intensity as a function of wavelength, for the present phosphor.

FIG. 2 is a perspective view illustrating a 40–watt fluorescent construction including a coating of the present phosphor.

DETAILED DESCRIPTION OF THE INVENTION

Referring to FIG. 1, the light intensity of the present phosphor, in arbitrary units, as a function of wavelength, is illustrated. As will be appreciated, the plot of FIG. 1 clearly illustrates a single prominent peak in the 520–560 nm region, with some inflections at other visible wavelengths. As previously mentioned, this is in contrast with the prior art phosphors, which disclose a number of emission lines, of comparable magnitude, in this wavelength region.

The quantum efficiency of this new phosphor has been measured at 97% with an absorption of 95% of the 254 nm excitation source. The lithium ion appears to act more than a typical charge compensating ion by possibly giving a better coupling between the Ce-Tb pair and thus promoting more efficient energy transfer from the cerium, which absorbs the incident 254 nm radiation, to terbium which gives the visible emissions. The small band at 330 nm is due to cerium emission.

Analysis of the emission spectrum for $Li_{.3}Ca_{.4}Ce_{.2}Tb_{.1}SO_4$ under 254 nm excitation follows:

TABLE I

| Emission Band | Rel. % Energy | Rel. % Quanta |
|---|---|---|
| 330 nm | 16.0 | 10.0 |
| 485 | 9.0 | 8.0 |
| 545 | 55.0 | 58.0 |
| 585 | 12.0 | 13.5 |
| 620 | 6.0 | 7.0 |
| others | 2.0 | 3.5 |

In a typical 3 component lamp, the 330 nm emission would be absorbed by the blue component ($Eu^{+2}$) and reemitted as visible light. Note that most of the emission is at 545 nm.

The effects of changes in $Tb^{+3}$ and $Ce^{+3}$ concentrations on color and brightness of these phosphors are shown in the following table.

TABLE II

| | Brightness 2537A Excitation | Color 2537A Excitation | |
|---|---|---|---|
| | | x | y |
| $Li_{.20}Ca_{.60}Ce_{.10}Tb_{.10}SO_4$ | 87 | 306 | 554 |
| $Li_{.25}Ca_{.50}Ce_{.15}Tb_{.10}SO_4$ | 94 | 303 | 555 |
| $Li_{.30}Ca_{.40}Ce_{.20}Tb_{.10}SO_4$ | 100 | 302 | 552 |
| $Li_{.25}Ca_{.50}Ce_{.18}Tb_{.07}SO_4$ | 90 | 299 | 552 |
| $Li_{.30}Ca_{.40}Ce_{.15}Tb_{.15}SO_4$ | 93 | 303 | 555 |

The color points do not change significantly with either $Ce^{+3}$ or $Tb^{+3}$ concentration changes. The optimum composition is near $Li_{.3}Ca_{.4}Ce_{.2}Tb_{.1}SO_4$.

EXAMPLE

The preferred method of preparation is as follows using as an example $Li_{.3}Ca_{.4}Ce_{.2}Tb_{.1}SO_4$ composition:

| | |
|---|---|
| .006 mol $Li_2CO_3$ | .44 gm |
| .016 mol $CaCO_3$ | 1.60 gm |
| .008 mol $Ce(NO_3)_3 \cdot 6 H_2O$ | 3.48 gm |
| .001 mol $Tb_4O_7$ | .76 gm |
| .080 mol $(NH_4)_2SO_4$ excess | 10.60 gm |

The above ingredients are thoroughly blended. The mixture is first covered and fired for one hour at 400° C then thoroughly reblended. A second covered firing occurs for one hour at 675° C to give the final product. Numerous variations in firing times and temperatures were performed.

The following F-lamp chromaticity results were obtained using $Li_{.3}Ca_{.4}Ce_{.2}Tb_{.1}SO_4$ phosphor in an ethyl cellulose binder system. Zero hour data are:

Lumens 4081 at $x = 0.304$ $y = 0.533$

The present invention utilizes a phosphor coating which may be applied to a 40WT12 type fluorescent lamp. A lamp of this construction is depicted in FIG. 2 and comprises an assembly 11 having a tubular shape glass envelope 12 which can be fabricated of soda-lime glass, for example, sealed at each end with mounts 19. Each mount includes a vitreous portion 18 in which are sealed electrode structures 14 each having a refractory metal coil supported and electrically connected to lead-in conductors 16 and 17. The phosphor coating 13 of the present invention is applied to the inner surface of the lamp glass envelope in the usual manner.

It should be understood that the invention is not limited to the exact details of construction shown and described herein for obvious modifications will occur to persons skilled in the art.

What is claimed as new and desired to be secured by Letters Patent of the United States is:

1. A luminescent material comprising crystals of:

$M_wCa_xCe_yTb_zSO_4$ wherein M = Lithium or sodium $w = y + z$
$x = 1 - (w + Y + z) > 0.3$
$y = 0.05$ to $0.25$
$z = 0.05$ to $0.20$ said material exhibiting relatively high quantum efficiencies for emissions in the visible green spectral region, when excited by 2537A radiation 2. A luminescent material in accordance with claim 1 characterized by the formula:

$Li_{.3}Ca_{.4}Ce_{.2}Tb_{.1}SO_4$.

3. A fluorescent lamp including a sealed glass envelope having means contained therein to generate 254 nm radiation and coated on an inner surface of said envelope a phosphor material comprising crystals of:

$M_wCa_xCe_yTb_zSO_4$ wherein M = lithium or sodium
$w = y + z$
$x = 1 - (w+Y+z) > 0.3$
$y = 0.05$ to $0.25$
$z = 0.05$ to $0.20$ 4. The lamp of claim 3 wherein the phosphor material is characterized by the formula:

$Li_{.3}Ca_{.4}Ce_{.2}Tb_{.1}SO_4$.

5. A method of phosphor preparation comprising the steps:
a. blending a mixture of phosphor ingredients consisting essentially of:
 a. one salt from the group $Li_2CO_3$, $Na_2CO_3$
 b. $CaCO_3$
 c. $Ce(NO_3)_3 \cdot 6H_2O$
 d. $Tb_4O_7$
 e. $(NH_4)_2SO_4$
in preselected amounts to form $M_wCa_xCe_yTb_zSO_4$ wherein
M = lithium or sodium
$w = y+z$
$x = 1 - (w+y+z) > 0.3$
$y = 0.05$ to $0.25$
$z = 0.05$ to $0.20$
b. and firing the blended mixture in a covered vessel at elevated temperatures in the range 300°–500° C for 1–2 hours.

6. The method of claim 5 together with the steps of reblending the first fired material, then refiring the material in a covered vessel at elevated temperatures in the range 600°–750° C from 1–4 hours.

* * * * *